United States Patent [19]

Lawson

[11] 4,358,978
[45] Nov. 16, 1982

[54] TRIMMING STRIP MATERIAL
[75] Inventor: Kenneth T. Lawson, Middlesbrough, England
[73] Assignee: The Head Wrightson Machine Co. Ltd., Middlesbrough, England
[21] Appl. No.: 160,280
[22] Filed: Jun. 17, 1980
[30] Foreign Application Priority Data
Jun. 26, 1979 [GB] United Kingdom ............... 7922196
[51] Int. Cl.³ ............................................ B26D 5/00
[52] U.S. Cl. ....................................... 83/364; 83/365; 83/368; 83/425.3; 83/428; 83/471.3; 83/479
[58] Field of Search ................ 83/71, 364, 365, 368, 83/371, 425, 425.2, 425.3, 425.4, 428, 433, 471.2, 471.3, 477.1, 479, 500, 504, 885, 886, 887

[56] References Cited
U.S. PATENT DOCUMENTS

| 3,110,208 | 11/1963 | Mitchell et al. | 83/425 X |
| 3,176,567 | 4/1965 | McCormick et al. | 83/364 |
| 3,262,650 | 7/1966 | Randich | 83/425 X |
| 3,513,743 | 5/1970 | Montguire | 83/433 |
| 3,550,490 | 12/1970 | Hicks | 83/365 X |
| 3,719,114 | 3/1973 | Vischulrs | 83/368 X |
| 3,727,503 | 4/1973 | Braner et al. | 83/479 |
| 3,753,381 | 8/1973 | Reime et al. | 83/364 |
| 3,774,491 | 11/1973 | Killilea | 83/428 X |
| 3,776,072 | 12/1973 | Gerber et al. | 83/71 X |

FOREIGN PATENT DOCUMENTS 1335477 10/1973 United Kingdom ................ 83/368

Primary Examiner—Frank T. Yost
Assistant Examiner—Robert P. Olszewski
Attorney, Agent, or Firm—Frost & Jacobs

[57] ABSTRACT

Edge trimming apparatus and method for trimming off wavy edges of strip material, e.g. metal strip, wherein rotary trimming knives for each edge of the strip are movable transversely relative to the advancing strip. The knives are pivotally supported about vertical axis and can have their transverse spacing adjusted, the support blocks preferably being transversely slidable in guides which are mounted on a carriage which itself is transversely movable relative to the advancing strip. Edge sensors are located adjacent edge regions of the strip and signals from the sensors are passed to a device, for example a hydraulic jack, for moving the carriage transversely.

16 Claims, 8 Drawing Figures

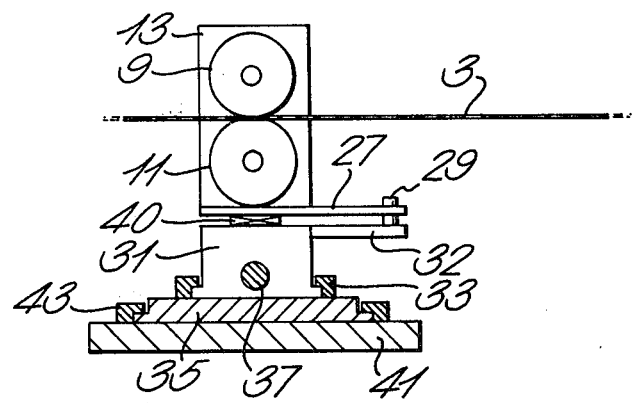
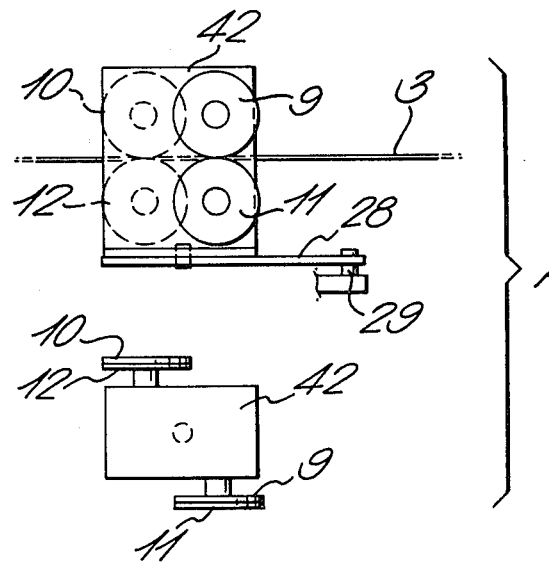

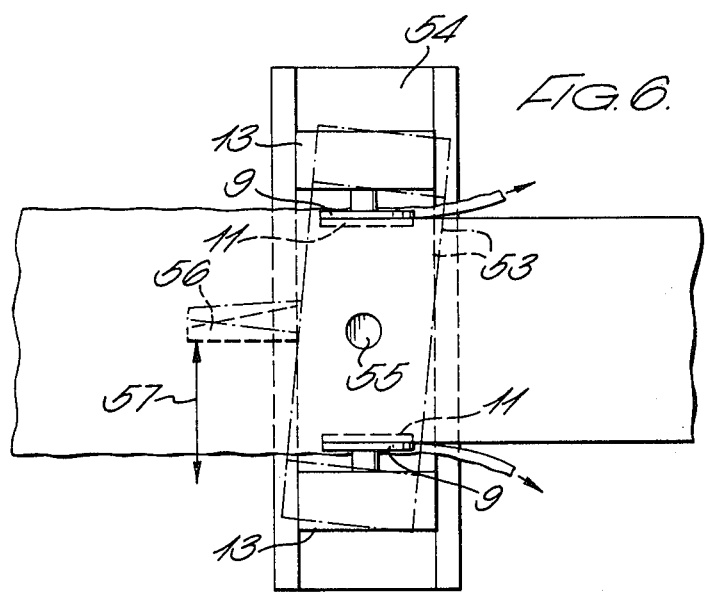
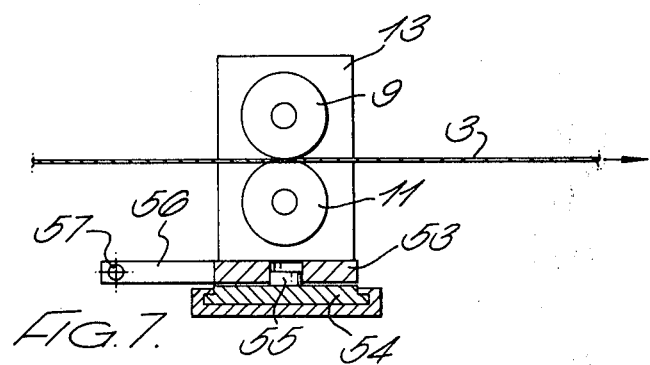
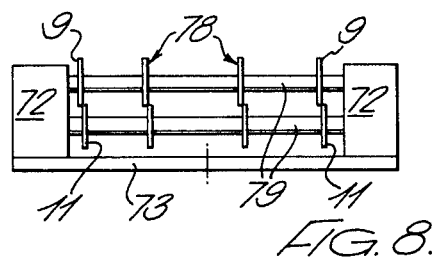

TRIMMING STRIP MATERIAL

This invention relates to an apparatus for and method of trimming the edges of continuous strip material, e.g. metal strip, and/or for slitting the strip material into two or more narrower strips of material.

BACKGROUND OF THE INVENTION

Rolled metal strip, after its manufacture, will always have non-uniform or wavy edges which have to be trimmed before the strip is rolled into coils. Conventional edge trimmers utilize rotating circular knives to trim the edges of the strip in order to obtain an accurate and constant strip width. The trimmer knives may either be driven or free running. Normally, the knives, one arranged above the strip and the other below the strip, are set with predetermined horizontal and vertical clearances and they may be set parallel to the direction of advance of the strip past the knives or they may be set at a slight angle in order to achieve the optimum cutting action which is free from burrs. However, once the knives have been correctly set to trim a given thickness and width of strip, they are maintained in that position.

Apart from having wavy edges, the whole strip may be badly shaped, i.e. it may not be straight and may be curved. Such faults often give rise to tracking problems and as the strip moves over a series of rolls in the processing or trimming line it can wander from side to side. It has been proposed therefore, to guide the strip accurately to the trimmer knives, otherwise sideways movement of the strip will cause one edge of the strip to run out of contact with the knives. This can cause disastrous results because invariably the knives will not re-engage the edge of the strip again. In order to guide the strip for known trimmer knives, several steering and guiding rolls have always been provided which are expensive both because they constitute extra equipment and take up valuable space, and it is an object of this invention to overcome these disadvantages.

In an alternative prior art proposal, instead of guiding the strip to the knives, the knives are moved axially relative to the line of advance of the strip (see, for example, U.K. Pat. No. 1,335,477). This is not satisfactory with metal strips because the lateral forces bearing on the edges of the knives would be very large and the cutting edge of the knives would be damaged and possibly the knives themselves would break. In any event, it would certainly cause rapid wear which would call for replacement of the knives at frequent intervals.

The present invention has been evolved to overcome the above problems in a relatively cheap and convenient manner.

SUMMARY OF THE INVENTION

According to the present invention, we provide a method of trimming the edges of and/or slitting strip material wherein the strip is advanced past at least one knife and the said at least one knife is pivotally supported, for steering movement transversely of the strip, about a generally vertical axis, so that the knife can be moved transversely with respect to the strip as required in dependence upon the transverse position of the strip as it is fed to the knife.

Also according to the present invention, we provide apparatus for trimming the edges of and/or slitting, strip material including at least one knife mounted for rotation about a generally horizontal axis, means to determine the deviation of the strip in the transverse direction from its normal line of advance past said at least one knife and means to move the knife transversely with respect to the normal path of advance of the strip when the strip deviates transversely from that normal path, said knife being pivotally supported about a generally vertical axis so that it can steer itself transversely of the strip. For slitting operations, more than one knife may be provided, depending upon the number of slit strips required, and for edge trimming, a knife is preferably provided for each edge of the original strip. Preferably, at each knife location, a set of upper and lower knives is provided.

Preferably, the knives are supported on a carriage which is supported on a fixed base for transverse movement relative to the strip and a plurality of sensors is provided to each side of the strip to sense the presence of the edge of the strip, the sensors being connected to a device to move the carriage as desired.

The device may be a hydraulic jack or a screw mechanism and the carriage is supported in slideways on a fixed base.

Preferably, for edge trimming, the sets of knives are pivotally supported about vertical axes on support blocks which themselves are mounted in guides on the carriage. The support blocks may be movable towards and away from each other in a sense transverse to the direction of advance of the strip to alter the spacing of the knives. The transverse spacing of the knives is preferably achieved by mounting the support blocks on a screw shaft rotatable by means of an electric motor on the carriage, the screw shaft having screw threaded portions of different sense which engage the respective support blocks.

In one embodiment of the invention, particularly for edge trimming, each set of knives is supported in a trimmer head mounted on the end of a pivot link which is pivotally connected to its respective support block.

Preferably, the two trimmer heads are connected together by a transverse tie. Preferably, the tie comprises a screw rod having end portions screw threaded in opposite senses, these end portions engaging with threaded sleeves which are pivotally connected to the respective trimmer heads. While the tie bar may be located beneath the strip with the fixed base, carriage and support blocks off-set relative to the trimmer heads, it is preferred that the fixed base, carriage and support blocks are located beneath the trimmer heads with the pivot for the trimmer heads being carried on an extension arm projecting from the support blocks and the tie bar located above the strip on the top of the trimmer heads. With this construction the trimmer heads may be supported on a support bearing on top of its respective support block.

If desired, the trimmer heads may be rotatable through at least 180° and carry a spare set of trimmer knives.

In an alternative construction, the trimmer heads which rotatably support the knife sets are attached to a sub-base, which is pivotally supported on a sliding base which slides in parallel slideways on a fixed base. In this construction, a cantilever arm preferably extends outwardly from the sub-base, and the device (e.g. hydraulic jack or screw mechanism) acts on this to pivot the sub-base relative to the sliding base.

If desired, the trimmer heads which are located one on each side of the strip, instead of having two stub shafts for rotatably supporting the cutting knives, may be interconnected with upper and lower cross shafts on which not only the upper and lower trimmer knives are rotatably supported, but also one or more slitter knives. Obviously, in this construction the knives can be spaced as desired along the shafts.

DESCRIPTION OF THE DRAWINGS

Several embodiments of the present invention are now described by way of example with reference to the accompanying drawings, in which:

FIG. 4 is a sectional elevation of a second preferred embodiment of the invention;

FIG. 5 shows respectively plan and side elevational view of an alternative embodiment of trimmer head which is rotatable;

FIG. 6 is a plan view, similar to FIG. 1, of another embodiment of edge trimmer;

FIG. 7 is a sectional elevation of the apparatus of FIG. 6, and

FIG. 8 is an end elevation showing the apparatus of FIGS. 6 and 7 modified to slit the strip into three narrow strips, and trim the outside edges.

DESCRIPTION OF THE PREFERRED EMBODIMENTS

Figure 1:
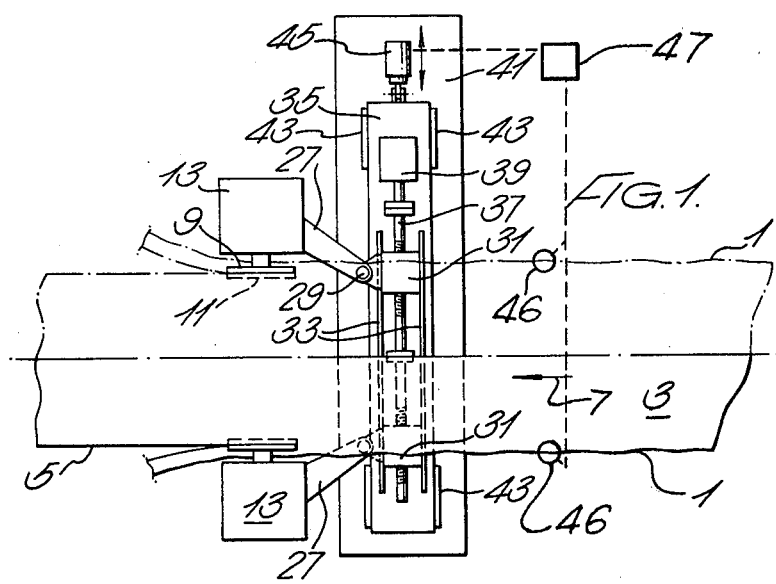
FIG. 1 is a plan view of one embodiment of strip edge trimming apparatus.
Figure 2:
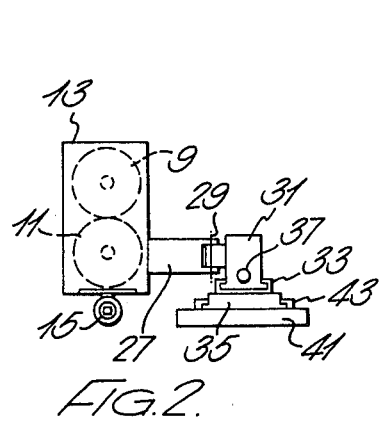
FIG. 2 is a side elevation of the apparatus of FIG. 1.

Referring to FIGS. 1 and 2 of the drawings, trimmer apparatus is shown for trimming off the wavy edges 1 of metal strip 3 so as to provide straight edges 5 after the strip has been advanced in the direction of the arrow 7 past the apparatus.

Figure 3:
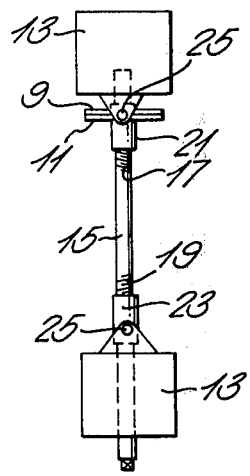
FIG. 3 is a partly schematic plan view of a detail associated with the trimmer knives.

For each edge of the strip, a set of upper and lower trimming knives 9 and 11 is provided, the knives being rotatably mounted about horizontal axes in a trimmer head 13. The two knives of each set are slightly off-set horizontally and vertically with respect to each other and the nip between the knives of each set is arranged to cut off a predetermined width of edge portion of the strip to provide the straight edges 5. The two trimmer heads 13 are interconnected by a tie bar 15 which in the embodiment of FIGS. 1-3 is located beneath the trimmer heads, the tie bar 15 having end portions 17 and 19 screw threaded in opposite directions which engage in internally threaded sleeves 21, 23, which are pivotally connected to the respective trimmer heads 13 by means of vertical pivot connections 25, the locations of which correspond with the nip of the knife edges. The tie bar 15 can be rotated manually or automatically to give fine adjustment to the spacing between the trimmer heads and hence the knives at each edge of the strip.

The trimmer head 13 is carried by a link 27 which is pivotally connected about a vertical axis 29 to a projecting arm on a support block 31. The support blocks 31 are slidable transverse to the direction of advance of the strip 3 between a pair of guides 33 which themselves are supported on a carriage 35. The support blocks 31 are screw threadedly engaged with a screw shaft 37, the thread associated with one block 31 being of a different hand than that associated with the other block 31. The shaft 37 is rotated by means of a motor 39 supported on the carriage 35 so as to move the support blocks towards or away from each other dependent upon direction of rotation of shaft 37.

The carriage 35 is itself mounted for transverse movement relative to the direction of advance of the strip 3 on a fixed base 41 and for this purpose is supported between two sets of parallel slideways 43. Movement of the carriage 35 relative to the fixed base 41 is achieved with the aid of a hydraulic jack 45.

As the strip 3 is advanced in the direction of the arrow 7 so its edge regions, because the strip is not straight but curved over its length, will move from side to side relative to the centerline of the strip if it was centrally orientated with respect to the trimming apparatus. This divergence of the strip from the centerline is sensed by a plurality of sensing devices 46, e.g. photoelectric cells, located adjacent the edge regions of the strip immediately upstream of the trimming apparatus. The signals received by the sensing device are converted by converter 47 into an adjustment signal which is passed to the hydraulic jack 45 which is then either extended or retracted so as to move the carriage 35 in the desired direction to ensure that the knives 9 and 11 maintain contact with the edge regions of the strip and continue their trimming operation.

In the alternative construction shown in FIG. 4, like parts have the same reference numerals as FIGS. 1 and 2. The difference between this construction and that of FIGS. 1 and 2 is that the fixed base 41, carriage 35 and the slideways and guideways together with the support blocks 31 are all located beneath the trimmer heads 13, thus providing a more compact arrangement. Each support block 31 is provided with an extension arm 32 on which the pivots 29 for the links 27 are provided. Furthermore, because the blocks 31 are located beneath the heads 13, support bearings 40 can be provided for each trimmer 13. These support bearings may take the form of a simple greased lubricated slideway or they may incorporate roller, air or similar bearings. In this way, of course, the loads on the pivots 29 are reduced as are the loads on the links 27. Furthermore, because of the presence of the tranversing mechanism beneath the trimmer heads, the tie rod 15 and associated equipment for altering the spacing of the trimmer heads is located above the strip and trimmer heads (but not shown).

In a further modification of the invention shown in FIG. 5, the support blocks for the trimmer knives 9 and 11 may be enlarged in size as shown at 42 and may be pivotally supported on link arms 28 which themselves are connected to the pivots 29. This means that auxiliary sets of trimming knives 10 and 12 may be rotatably supported on the face of the heads remote from those supporting the knives 9 and 11. When one set of knives becomes worn, the heads 42 can be rotated through 180° and the other trimmer knives 10 and 12 brought into operation, whereupon the worn knives can be sharpened or replaced.

By providing both the tie rod 15 and the adjustment shaft 37, it is possible to set the distance between the knives of the two sets slightly greater apart than that between the blocks 31. This means that the sets of knives are slightly skewed inwards towards the advancing strip and this means that a good clean cut is achieved during trimming and that the cut-off edge portions of the strip are directed away from the straight edges of the strip as shown in FIG. 1.

In the modified construction shown in FIGS. 6 and 7, like parts have the same reference numerals as in the previous embodiments. However, instead of a linkage mechanism a centre pivot is provided midway between the two sets of knives 9,11. The knives 9,11 are rotatably mounted in trimmer heads 13 attached to a sub-base 53. The sub-base 53 is attached to a sliding base 54 by means of a central pivot 55. The sub-base 53 and the trimmer knives are pivoted by means of a hydraulic jack or similar device at position 57 acting on a cantilever arm 56 projecting from the sub-base 53. The sub-base 53 and the trimmer knives 9, 11 are shown in a pivoted position in ghost outline in FIG. 6. As in the previous embodiments, once the trimmer knives have been rotated slightly they will be able to traverse across the strip.

Furthermore, means for detecting the edges of the strip are employed and a feed-back signal of strip position to the position of the trimmer is used to control the hydraulic jack or a screw mechanism at position 57 so as to pivot the trimmer in the correct direction and thus make it move to keep in line with the edges of the strip. As with the previous embodiments, the sliding base 54 is slidable transversely in slideways 43 on a fixed base 41.

FIG. 8 shows a modified machine arranged to slit strip into three widths and at the same time to remove the edge scrap material. As well as the slitting knives 9,11, two further sets of knives 78 are supported on cross shafts 79 in support heads 72 mounted on a sub-base 73. The knives are adjustably mounted on the cross shafts 79 to enable adjustment of the distance between the sets of knives. The sub-base 73 is pivotally mounted as described above so that the slitter/trimmer can also be made to keep in line with the strip, as in the previous embodiment.

By providing the generally vertical pivots for the slitting or trimming knives, the cutting plane of the knives can be altered very slightly and since the knives act like wheels, once their cutting plane is altered, they will tend to steer themselves, rather like a wheel running on a flat surface, across the strip 3, and hence there is little resistance to transverse movement of the knives relative to the strip.

What we claim is:

1. Apparatus for trimming the edges of strip material including at least one knife mounted for rotation about a generally horizontal axis, pivot means displaced from said knife and pivotally supporting said knife about a generally vertical axis, means to determine the deviation of said strip in a transverse direction from its normal line of advance, and means to move said pivot means transversely of the strip to compensate for deviation of said strip, the displacement of said pivot means from the knife being in such direction that when said pivot means is moved transversely, the knife will steer itself across the strip to a new position during relative movement between the strip and the knife.

2. Apparatus according to claim 1 wherein at each knife location, a set of upper and lower knives is provided.

3. Apparatus according to claim 2 wherein said knives are supported on a carriage, wherein said carriage is supported on a fixed base for transverse movement relative to said strip, and wherein said means to determine the deviation of said strip includes a plurality of sensors position on each side of said strip to sense the presence of the edge of said strip, said sensors being connected to a device to move the carriage as desired.

4. Apparatus according to claim 3, wherein there are two sets of said knives pivotally supported about vertical axes on support blocks, said blocks being mounted in guides on said carriage, and means for moving said support blocks toward and away from each other in a direction transverse to the direction of advance of said strip.

5. Apparatus according to claim 4 wherein said support blocks are mounted on a screw shaft rotatable by means of an electric motor on the carriage, said screw shaft having screw threaded portions of different hand which engage the respective support blocks.

6. Apparatus according to claim 3 wherein there are two sets of knives and each set of knives is supported in a trimmer head mounted on the end of a pivot link, which is pivotally connected to a respective support block about a generally vertical axis.

7. Apparatus according to claim 6 including a transverse tie connecting together said trimmer heads, said trimmer heads being laterally spaced apart by said transverse tie.

8. Apparatus according to claim 7 wherein said tie comprises a screw rod having end portions screw threaded in opposite directions, these and portions engaging with threaded sleeves which are pivotally connected to the respective trimmer heads.

9. Apparatus according to claim 6 wherein said fixed base, carriage and support blocks are located beneath said trimmer heads with the pivot for the trimmer heads being carried on an extension arm projecting from said support blocks.

10. Apparatus according to claim 9 wherein said trimmer heads are supported on a support bearing on top of said respective support blocks.

11. Apparatus according to claim 6 including means mounting said trimmer heads for rotation through at least 180°, and wherein said trimmer heads carry a spare set of trimmer knives.

12. Apparatus according to claim 6 wherein said trimmer heads which rotatably support said knife sets are attached to a sub-base which is pivotally supported on a sliding base which slides in parallel slideways on a fixed base.

13. Apparatus according to claim 12 wherein a cantilever arm extends outwardly from said sub-base to assist with pivoting the sub-base relative to the sliding base.

14. Apparatus according to claim 13 wherein said trimmer heads are inter-connected by upper and lower cross shafts on which sets of upper and lower edge trimmer knives and at least one set of upper and lower slitting knives are rotatably mounted.

15. Apparatus according to claim 13 wherein said trimmer heads are interconnected by upper and lower cross shafts on which a plurality of sets of upper and lower slitting knives are rotatably mounted.

16. Apparatus according to claim 15 wherein the slitting knives are adjustably mounted on the cross shafts to enable the distance between slitting knives to be adjusted.

* * * * *